United States Patent
Wang et al.

(10) Patent No.: US 6,908,705 B2
(45) Date of Patent: Jun. 21, 2005

(54) THIN-WALLED BATTERY FOR PORTABLE ELECTRONIC EQUIPMENT

(75) Inventors: Chuangfu Wang, Shenzhen (CN); Dehe Mao, Shenzhen (CN); Zhixue Huang, Shenzhen (CN)

(73) Assignee: Shenzhen LB Battery Co., Ltd. (CN)

( * ) Notice: Subject to any disclaimer, the term of this patent is extended or adjusted under 35 U.S.C. 154(b) by 90 days.

(21) Appl. No.: 10/168,261

(22) PCT Filed: Dec. 21, 2000

(86) PCT No.: PCT/CN00/00643

§ 371 (c)(1),
(2), (4) Date: Jan. 23, 2003

(87) PCT Pub. No.: WO01/47046

PCT Pub. Date: Jun. 28, 2001

(65) Prior Publication Data

US 2003/0148177 A1 Aug. 7, 2003

(30) Foreign Application Priority Data

Dec. 22, 1999 (CN) .................................. 99256043 U
Apr. 25, 2000 (CN) .................................. 00227958 U

(51) Int. Cl.⁷ .............................. H01M 2/06; H01M 2/08
(52) U.S. Cl. .................. 429/181; 429/184; 429/185
(58) Field of Search ............................. 429/181, 184, 429/179

(56) References Cited

U.S. PATENT DOCUMENTS

| | | | | |
|---|---|---|---|---|
| 4,455,357 A | * | 6/1984 | Rorer et al. ................. | 429/179 |
| 4,582,767 A | * | 4/1986 | Morioka et al. ............. | 429/121 |
| 4,659,636 A | | 4/1987 | Suzuki et al. ................ | 429/54 |
| 5,114,807 A | * | 5/1992 | Rowlette ..................... | 429/152 |
| 5,238,757 A | * | 8/1993 | Suzuki et al. ................ | 429/94 |
| 5,449,575 A | * | 9/1995 | Moulton ...................... | 429/179 |
| 6,139,986 A | * | 10/2000 | Kurokawa et al. ............ | 429/61 |
| 6,251,537 B1 | * | 6/2001 | Kim et al. ................... | 429/181 |
| 6,335,110 B1 | * | 1/2002 | Chang et al. ................. | 429/7 |
| 6,387,567 B1 | * | 5/2002 | Noh ........................... | 429/211 |
| 6,461,764 B1 | * | 10/2002 | Nakamura ................... | 429/170 |
| 6,610,443 B2 | * | 8/2003 | Paulot et al. ................ | 429/181 |

FOREIGN PATENT DOCUMENTS

| | | |
|---|---|---|
| JP | 5-135751 A | 6/1993 |
| JP | 10-21890 A | 1/1998 |

OTHER PUBLICATIONS

Patent Abstracts of Japan, Publication No. 5–13575A, published on Jun. 1, 1993.

Patent Abstracts of Japan, Publication No. 10–21890A, published on Jan. 23, 1998.

* cited by examiner

*Primary Examiner*—Mark Ruthkosky
(74) *Attorney, Agent, or Firm*—Osha & May L.L.P.

(57) ABSTRACT

The present invention provides a thin battery, comprising a metal case, a battery core formed by laminating and wrapping an anode, a septum and a cathode, an anode conductive terminal and a cathode conductive terminal, characterized in that: said metal case is made of a quadratic shallow trough having five thin-walls and a top cover welded on the trough; the shallow trough has outlets for the electrodes.

11 Claims, 2 Drawing Sheets

THIN-WALLED BATTERY FOR PORTABLE ELECTRONIC EQUIPMENT

FIELD OF THE INVENTION

The present invention relates to a thin battery, particularly to a thin battery suitable for portable electronic equipments.

BACKGROUND OF THE INVENTION

In resent years, for meeting the requirements of developing electronic equipment, especially communication equipments such as mobilephone, a thinner battery used as one of the necessary components of the said equipments is required. The conventional metal case used as the sealing case of the battery core is thicker and occupies more space. In order to overcome the above-mentioned defects, a composite material of metal foil and plastic film or thermos-fused polymer film is adopted. However, the strength of this composite material is not sufficient, and it is easier to deform which is harmful to the electronic equipments. Therefore, the application field of this composite material is limited It is well-known in the art that, during the use of some common batteries with a liquid electrolyte, such as nickel-cadmium battery, metal hydride-nickel battery, lithium ion battery and lithium battery, especially under the overcharged state, the production of gases is unavoidable. In view of safety, it is necessary to select a battery case having better mechanical strength. In consideration of safety, the metal case undoubtedly is a good choice. However, the thinness of the metal case is bound to bring many difficulties in manufacture process, including welding and sealing. For examples, the trough body of the battery is usually deeper which makes it difficult to put the battery core into the trough or the active substance on the electrode will be scraped during the process of putting the battery core into the trough. Moreover, the smaller area of the cover of the battery also increases the difficulty of laser welding. Moreover, the explosion-protective device mounted in the trough of the battery is usually a thin whittling concave trough. Because of the nature of metal and poor uniformity of thickness after whittling, the explosion-protective performance of the battery is generally unsatisfying. Having conducted studies for a long time, the inventors of the present invention eventually improved the battery case and the terminal sealing system to overcome the above-mentioned defects successfully, thereby completes the present invention.

OBJECT OF THE INVENTION

The object of the present invention is to provide a thin battery which is easy to be welded and assembled and having good sealing performance.

SUMMARY OF THE INVENTION

The present invention provides a thin battery comprising a metal case, a battery core formed by laminating and wrapping an anode, a septum and a cathode together, an anode conductive terminal and a cathode conductive terminal, characterized in that said metal case is made up of a quadrate or rectangular shallow trough having five thin-walls and a thin cover welded on the top of the trough; said shallow trough has outlets for the electrodes. According to the thin battery of the present invention, the trough is shallower and its opening is bigger, the battery core is easy to be put into the trough of the thin battery and the cover is easy to be welded.

According to the thin battery of the present invention, characterized in that an outlet for the conductive terminal is provided on the narrow side wall of the metal case, the outlet is sealed by a rubber stopper; one conductive terminal is guided out from the outlet passing through the rubber stopper, and the other conductive terminal is welded on the metal case and is guided out.

According to the thin battery of the present invention, characterized in that two outlets for the conductive terminals are provided on the narrow side wall of the metal case, the outlets are sealed by rubber stoppers; the anode conductive terminal and the cathode conductive terminal are guided out from the two outlets passing through the rubber stoppers respectively.

According to the thin battery of the present invention, said sealing rubber stopper of the metal case is a wedge-shaped stopper with a neck, which has the size corresponding to that of the outlet.

According to the thin battery of the present invention, the part of the metal case corresponding to the outlet is mechanically pressurized to make it deformed so that the metal case is tightly connected with the rubber stopper and the conductive terminals to form a sealed structure.

According to the thin battery of the present invention, said material of the sealing rubber stopper is selected from the group consisting of butadiene styrene rubber, neoprene rubber, butyl rubber, polyacrylate rubber and butadiene-acrylonitrile rubber.

According to the second aspect of the present invention, it is provided a thin battery comprising a metal case, a battery core formed by laminating and wrapping an anode, a septum and a cathode together, an anode conductive terminal and a cathode conductive terminal, characterized in that said metal case is made of a quadrate or rectangular shallow trough having five thin-walls and a thin cover welded on the top of the trough; at least one inwards recess with an aperture is provided on the bottom wall and along one of the side walls; a complex sealing element is provided to seal the recess and to connect with the conductive terminals.

According to the thin battery of the present invention, the complex sealing element includes an isolation element covering and clipping the bottom edge of the recess, and a metal element imbedded in the aperture.

According to the thin battery of the present invention, said isolation element is made of a plastic or rubber material and covers the bottom edge of the recess by means of, for example, compression casting so as to integrate it with the recess.

According to the thin battery of the present invention, said metal element is in the shape of rivet, and its shape and size is corresponding to those of the aperture of the recess and its height is slightly higher than the depth of the aperture, and when the metal element is imbedded, it is compressed longitudinally to expand horizontally, so that the metal element, the isolation element and the shallow trough are combined to form a good sealing system.

According to the thin battery of the present invention, the metal case is made of the materials selected from the group consisting of aluminum, stainless steel and nickel-plated steel.

According to the thin battery of the present invention, the bottom wall and the top cover of the aluminum case are provided with a reinforcing rib to increase the strength, said reinforcing rib is a concave-convex grove formed by mechanically stamping said trough and cover.

According to the thin battery of the present invention, said metal case has a shallow trough with four side walls having smaller surfaces and a bottom wall having larger surface. Therefore, it is easy to be manufactured. By adopting a cover having a size corresponding to that of the bottom wall of the trough to seal the side walls, the welding and assembling of the battery become easier. On one of the narrow side walls, said metal case has outlets for conductive terminals sealed by wedge-shaped rubber stoppers with a neck. The conductive terminals are guided out from the outlets passing through the rubber stoppers. The parts of said metal case corresponding to said outlets are mechanically pressured to make them deformed and thus to make the metal case, the rubber stoppers and the conductive terminals form tough sealing structure with good sealing performance. As an alternatively sealing method for the conductive terminals, said metal case has at least one small inwards recess with an aperture on the bottom wall and along one of the narrow side walls, a complex sealing element is provided to seal the recess and to connect with the conductive terminals to form an integrative sealing structure with the good sealing performance. In summary, the thin battery of the present invention solves the problems of the prior manufacture techniques including the problems for welding and sealing during the process for manufacturing a thin battery. The thin battery of the present invention has good sealing performance and meets the requirements of developing electronic equipments, especially communication equipments such as cell phones.

DETAILED DESCRIPTION

The present invention will be described in combination with the drawings hereinafter. It should be understood that the embodiments do not limit the scope of protection of the claims of the present invention.

Figure 1:
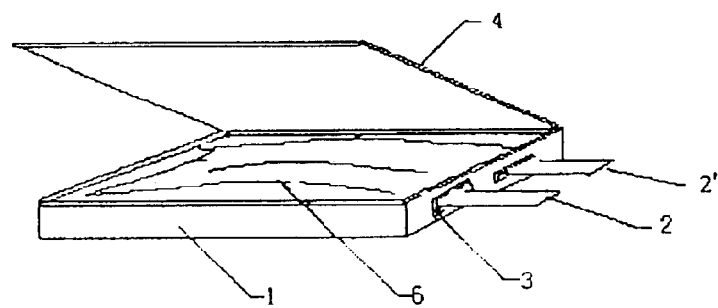
FIG. 1 shows the structure of the first embodiment of the thin battery of the present invention.
Figure 2:
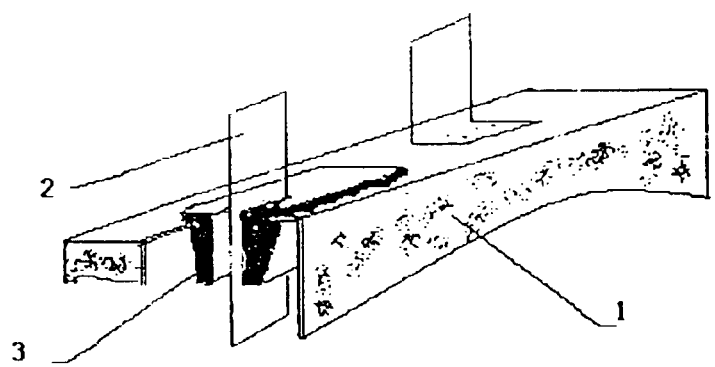
FIG. 2 shows the structure of the terminal sealing in the first embodiment of the thin battery of the present invention.
Figure 3:
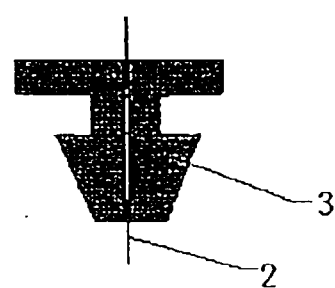
FIG. 3 shows the section view of the terminal sealing stopper in the first embodiment of the thin battery of the present invention.

FIG. 1 shows the structure of the first embodiment of the thin battery of the present invention. As shown in FIG. 1, the thin battery of the present invention comprises a metal case 1, a battery core 6 formed by laminating and wrapping an anode, a septum and a cathode together, an anode conductive terminal 2 and a cathode conductive terminal 2'. Wherein, the metal case 1 is made of a quadrate or rectangular shallow trough and a top covering 4 welded on the trough. On one of the narrow side walls of the shallow trough of the metal case 1, there are two outlets for guiding out the anode conductive terminal 2 and the cathode conductive terminal 2' respectively. The outlets are sealed by butadiene styrene rubber stoppers 3 as shown in FIG. 3 by means of the method shown in FIG. 2. The battery core 6 is a MH/NI battery core manufactured by the technique disclosed in the Chinese patent application No. CN1076313A. FIG. 2 shows not only the sealing method of the outlets, but also the situation of the battery case used as the cathode conductive terminal 2'. As shown in FIG. 2, an anode conductive terminal 2 is guided out from the outlet passing through a butadiene styrene rubber stoppers 3, while the other conductive terminal is welded on the inner surface of the top cover 4. The top cover 4 is welded on the shallow trough of the metal case 1, the part of the metal case 1 corresponding to the outlet is mechanically pressurized to deform, and to make the metal case 1, the rubber stoppers 3 and the conductive terminals 2 form a tough sealing structure. Fifty MH/NI batteries having the said structure are manufactured and are conducted the charging and discharging circle for 10 times. No liquid leaking is found among these batteries.

According to the present invention, the shallow trough of the metal case 1 can also have two outlets for the conductive terminals on one of the narrow side walls (As shown in FIG. 1). Fifty lithium-ion batteries, whose battery cores are lithium-ion battery core with a liquid electrolyte made by means of the technique as disclosed in the Chinese patent application No. CN1186335A, are manufactured according to the method mentioned above. These lithium-ion batteries are conducted the charging and discharging circle for 10 times. One battery has the problem of liquid leaking among these batteries.

The results of the above embodiments show that the present invention adopts rubber stopper sealing to replace conventional sealing and makes the metal case, the rubber stopper and the conductive terminals form a tough sealing structure so as to solve the problems of welding and sealing existed in the prior manufacture techniques for making a thin battery having a thinner metal case.

Figure 4:
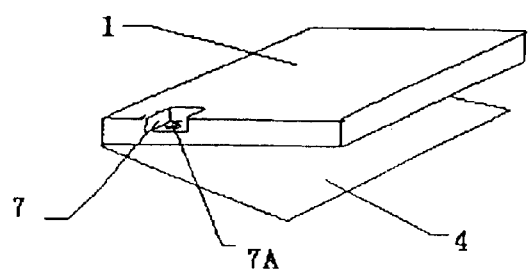
FIG. 4 shows the structure of the second embodiment of the thin battery of the present invention.
Figure 5:
FIG. 5 shows the section view of the recess on the battery case as shown in FIG. 4.
Figure 6:
FIG. 6 shows the section view of the recess of the battery case as shown in FIG. 5 clipped by an isolation element.
Figure 7:
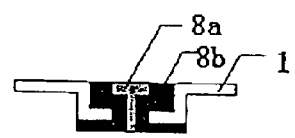
FIG. 7 shows the section view of the integrative structure of the recess of the battery case as shown in FIG. 4 clipping by a complex sealing element.

FIG. 4 shows the structure of the second embodiment of the thin battery of the present invention. In this embodiment, the same elements are indicated by the same labels as used in the first embodiment, but these labels are not shown in FIG. 4. As shown in FIG. 4 and FIG. 1, the thin battery of the present invention comprises a metal case 1, a battery core 6 usually used in this field, such as a battery core 6 formed by laminating and wrapping an anode, a septum and a cathode together, an anode conductive terminal and a cathode conductive terminal. Wherein, the metal case 1 is a quadrate or rectangular shallow trough of aluminum and an aluminum top cover 4 welded on the trough. As shown in FIG. 4 to FIG. 7, the shallow trough of the metal case 1 has a small recess 7 with an aperture 7A provided on the bottom wall and along one of the narrow side walls. A complex sealing element (8a+8b) seals the recess 7 and the aperture 7A. The complex sealing element includes an isolation element 8b clipping the edge of the aperture as well as the recess, and a metal element 8a imbedded in the aperture. The isolation element clips the bottom wall of the recess by means of compression casting PPS to integrate it with the recess. The shape and size of the metal element, which is in the shape of nail, match with those of the aperture of the isolation element and a little bit higher, and is compressed longitudinally to expand horizontally, so that the metal element and the isolation element and the shallow trough form a good sealing system. The battery core is a lithium ion battery core with a liquid electrolyte manufactured by means of the technique disclosed in the Chinese patent application No. CN186335A. A terminal is guided out by being welded on the lower end of the metal element 8a, while the other terminal is welted on the inner surface of the top cover 4. The top cover 4 is welded on the shallow trough of the metal case 1. The liquid electrolyte is injected into the battery via a liquid injection opening and the liquid injection opening is sealed by dot welding after the liquid electrolyte injection. In this way, fifty lithium-ion batteries are manufactured. These lithium-ion batteries are conducted the charging and discharging circle for 10 times. No liquid leaking is found among these batteries.

The battery case shown in FIG. 4 is manufactured by using aluminum as the metal material. The metal case 1 has two recesses 7 with an aperture 7A provided on the bottom wall and along one of the narrow side walls. The recesses 7 are sealed by complex sealing elements respectively. The battery core is a MH/NI battery core made by means of the technique disclosed in the Chinese patent application No. CN1076313A. The top covering 4 is welded on the shallow trough of the metal case 1. The liquid electrolyte is injected into the battery via a liquid injection opening and the liquid injection opening is sealed by dot welding after the liquid electrolyte injection. In this way, fifty MH/NI batteries are manufactured. These MH/NI batteries are conducted the charging and discharging circle for 10 times. One battery has the problem of liquid leaking among these batteries.

The results of the above-mentioned embodiments show that, according to the thin battery of the present invention, the shallow trough of the metal case has recesses with an aperture provided on the bottom wall and along one of the narrow side walls, and complex sealing elements instead of conventional sealing elements are used to make the metal element, the isolation element and the shallow trough form a good sealing system with good sealing performance so as to solve the problems existed in the prior manufacture method welding and sealing for making thin battery.

INDUSTRIAL APPLICABILITY

The thin battery of the present invention can be widely used in a variety of electronic equipments requiring thin batteries, especially communication equipments, such as mobile phones.

What is claimed is:

1. A thin battery comprising a metal case; a battery core formed by laminating and wrapping an anode, a septum and a cathode together; an anode conductive terminal; and a cathode conductive terminal, wherein said metal case is made of a rectangular shallow trough and a thin cover welded on top of the rectangular shallow trough, said rectangular shallow trough having four side walls and a bottom, wherein said metal case has an outlet on one of the four side walls, the outlet is sealed by a rubber stopper; one of the conductive terminals is guided out from the outlet passing through the rubber stopper, and the other conductive terminal is welded on the metal case and conducts electricity through the metal case.

2. A thin battery comprising a metal case; a battery core formed by laminating and wrapping an anode, a septum and a cathode together; an anode conductive terminal; and a cathode conductive terminal, wherein said metal case is made of a rectangular shallow trough and a thin cover welded on top of the rectangular shallow trough, said rectangular shallow trough having four side walls and a bottom, wherein said metal case has two outlets on one of the four side walls, the outlets are sealed by rubber stoppers; the anode conductive terminal and the cathode conductive terminal are separately guided out from the two outlets passing through the rubber stoppers.

3. The thin battery in accordance with claim 1 or 2, wherein said rubber stopper is a wedge-shaped stopper with a neck, which has a size corresponding to that of the outlet.

4. The thin battery in accordance with claim 3, wherein a portion of the metal case around the outlet is mechanically pressed so that the metal case, the rubber stopper, and the conductive terminals form a seal over the outlet.

5. The thin battery in accordance with claim 1 or 2, wherein a material of the rubber stopper is selected from the group consisting of butadiene styrene rubber, neoprene rubber, butyl rubber, polyacrylate rubber and butadiene-acrylonitrile rubber.

6. A thin battery comprising a metal case; a battery core formed by laminating and wrapping an anode, a septum and a cathode together; an anode conductive terminal; and a cathode conductive terminal, wherein said metal case is made of a rectangular shallow trough and a thin cover welded on top of the rectangular shallow trough, the rectangular shallow trough having four side walls and a bottom; an inwards recess having an aperture is provided on the bottom along one of the four side walls; and a complex sealing element is provided to cover the inwards recess and to connect one of the conductive terminals.

7. The thin battery in accordance with claim 6, wherein said complex sealing element includes an insulating piece covering the recess and a metal piece in an insulating passage that is part of the insulating piece and passes through the aperture.

8. The thin battery in accordance with claim 7, wherein said insulating piece is made of a plastic or rubber material.

9. The thin battery in accordance with claim 7, wherein said metal piece is in a shape of a rivet having a head portion and a body portion, the insulating piece has an indentation around the insulating passage adapted to receive the head portion of the metal piece, and a shape and a size of the body portion of the metal piece corresponds to a shape and a size of the insulating passage, a height of the head portion of the metal piece is slightly higher than the depth of the indentation, and when the metal piece is pressed longitudinally the head portion of the metal piece expands horizontally, so that the metal piece, the insulating piece and the rectangular shallow trough form a good sealing system over the aperture.

10. The thin battery in accordance with claim 1, 6 or 2, wherein the metal case is made of a material selected from the group consisting of aluminum, stainless steel, and nickel-plated steel.

11. The thin battery in accordance with claim 10, wherein the material is aluminum and the bottom of the metal case and the cover of the metal case are provided with at least one reinforcing rib.

\* \* \* \* \*